Dec. 17, 1940.   G. A. TINNERMAN   2,225,394
FASTENING MEANS
Filed Oct. 30, 1937    2 Sheets-Sheet 1
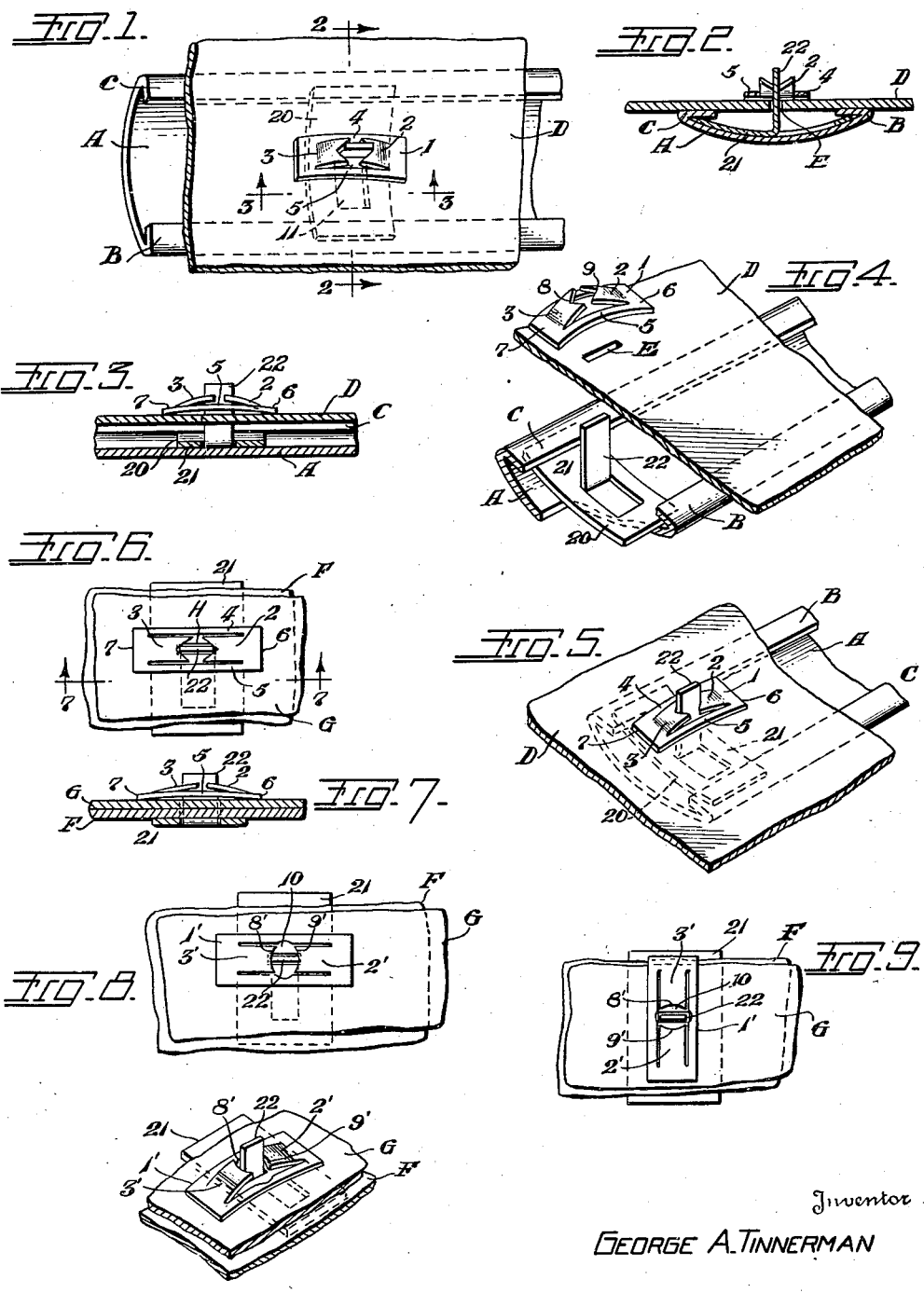
Inventor
GEORGE A. TINNERMAN
By
H. G. Lombard
ATTORNEY Dec. 17, 1940.　　　G. A. TINNERMAN　　　2,225,394
FASTENING MEANS
Filed Oct. 30, 1937　　　2 Sheets-Sheet 2
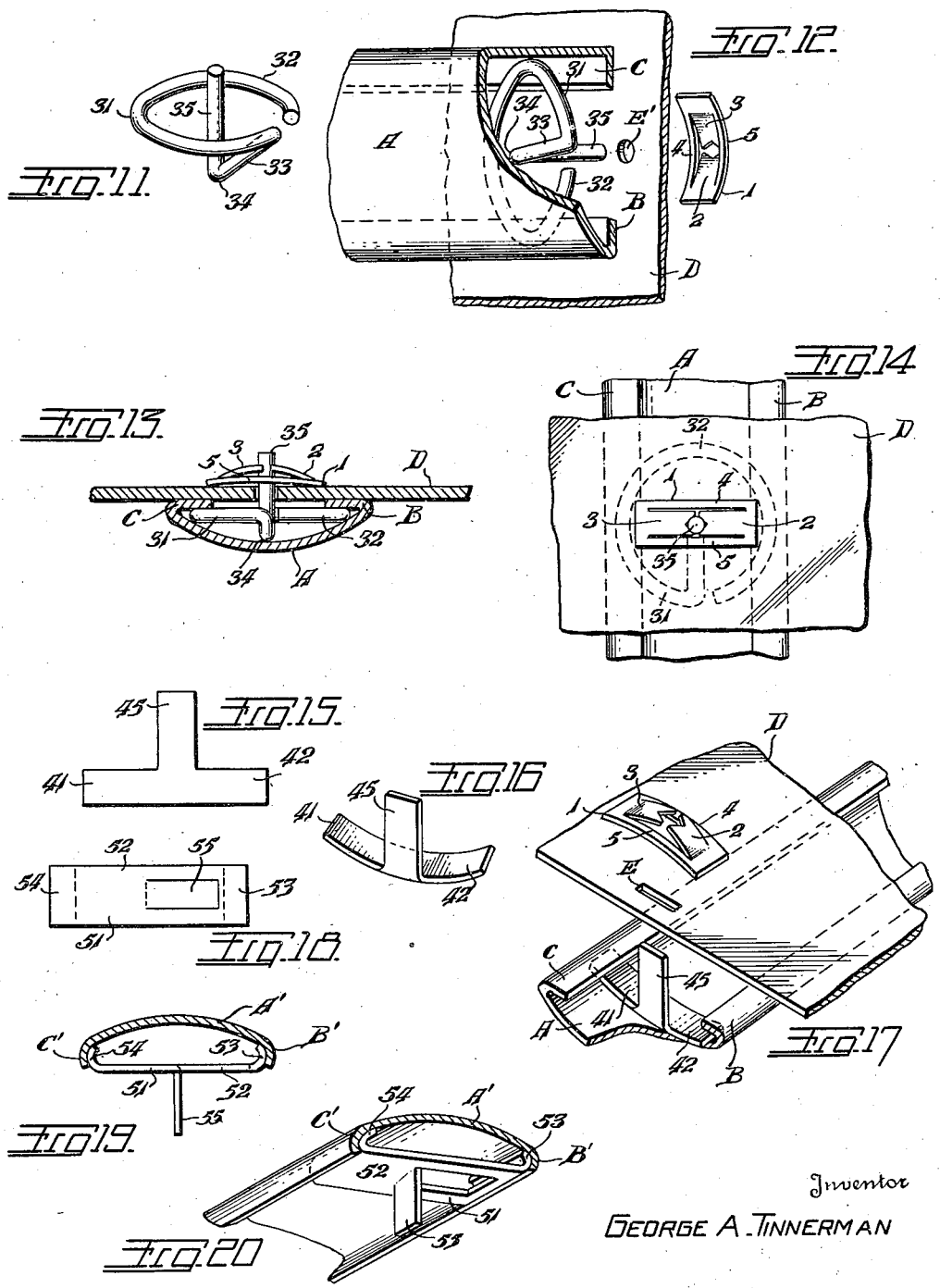
Inventor
GEORGE A. TINNERMAN
By H. G. Lombard
ATTORNEY Patented Dec. 17, 1940

2,225,394

UNITED STATES PATENT OFFICE 2,225,394

FASTENING MEANS

George A. Tinnerman, Rocky River, Ohio, assignor, by mesne assignments, to Tinnerman Products, Inc., Cleveland, Ohio, a corporation of Ohio Application October 30, 1937, Serial No. 171,998

17 Claims. (Cl. 85—5)

This invention relates to molding installations, and the like, embodying means for attaching metallic moldings, metal trim or finishing objects to supporting structures, particularly metallic supports such as found in automobile bodies, metallic building structures, gas or electric ranges, metal partitions, door frames, window frames, refrigerator cabinets and many other assemblies comprising metal sheet material, fibre board, glass, vitreous coated sheets and surfaces formed of hardened plastic compositions.

More particularly, the present invention relates to improved means for the attachment of moldings and like objects to a supporting structure comprising connector or retainer devices effecting an interlocking engagement between the molding or trim object and the supporting structure in combination with spring fastenings securing the retainer or connecting devices to the supporting structure under continuous spring tension thereby providing an installation in which the molding or trim object is fixed and rigid in applied position and not subject to loosening, displacement or possible removal incident to vibration, jarring and strain.

Heretofore, metallic trim material has usually been attached to a supporting structure by means of wire or sheet metal clips having cooperative engagement with the molding or trim material and capable of being applied to apertures in the supporting structure in the manner of a snap-stud. However, it has been found that snap-stud clips of this character, when employed in an installation subject to any material degree of strain and vibration as, for example, takes place in an automobile body, are inefficient and impractical in that they tend to work free from applied position to the extent that the trim material becomes loose and often completely removed resulting in an unsightly appearance and causing objectionable squeaks, rattles and other annoying sounds in the operation of the automobile.

Furthermore, in the application of relatively wide trim material such snap-stud clips are not practical in that they must necessarily be constructed of wire or sheet metal strip material, and accordingly, no adequate, positive, connection of the clips to the relatively wide trim material may be obtained; it has therefore been necessary to attach relatively wide trim material by means of bolts provided with enlarged heads designed to seat within the molding and cooperate with conventional nut devices for securing the trim material to the supporting structure. However, the attachment of trim material by means of such bolt fastenings is laborious and time consuming, requires the use of lock washers and is not always effective in that, even with the use of lock washers, the installation becomes loose by reason of the fact that the enlarged bolt heads do not have a fixed rigid engagement with the molding in their initial attachment and subsequently work loose to cause objectionable squeaks and rattles.

It is therefore a primary object of this invention to provide an arrangement for attaching superposed parts and securing finishing objects such as moldings and like trim material to supporting structures without the use of threaded fasteners of any kind or of snap-stud clips, and in such manner that the part or object secured is installed in a fixed, rigid mounting under spring tension and is not subject to loosening or displacement either in the connection of the retaining means with the object or part supported or in the means for securing the assembly to the supporting structure.

Another object of the invention is to provide an installation comprising a hollow molding and spring retainer devices to secure it in place on a support, which retainer devices are sprung into the molding and normally maintained in applied position along the length thereof due to their inherent resiliency.

Still another object of the invention is to provide in such an installation an arrangement by which mounting of the molding on the supporting structure is under continuous spring tension supplied by spring securing means cooperating with the individual retainer devices assembled in the molding.

A further object of the invention is to provide an installation for attaching a molding to a supporting structure by retainer means comprising shank elements designed for cooperative engagement with spring locking plates which, in applied position, are adapted to draw the molding toward the supporting structure in providing a fixed, rigid resilient mounting.

A still further object contemplates the provision of an installation comprising a retainer or connector means having a fixed, rigid interlocking under spring tension with the member to be mounted, and in which the retainer is secured to the supporting structure by a locking plate also supplying spring tension, thereby providing a resilient installation in which the members are united in locked relation under spring tension throughout.

A further object comprehends in an installation embodying a resilient retainer and spring locking plate for mounting a member on a support, a continuously effective spring holding action exerted axially by the locking plate on the retainer to draw the member to be mounted in close engagement with the support, and with the resilience of locking plate and the resilience of the retainer mutually contributing to the effectiveness of this spring holding action.

Another object of the invention aims to provide various forms of retainer devices adapted for interlocking relation under spring tension with the molding or trim object, and which retainers are simple, inexpensive, and economically manufactured from a minimum of stock without loss or waste of material.

A further object of the invention is to provide a retainer for attaching an object to a supporting structure comprising a member dependent therefrom providing a shank adapted for locking engagement with a spring locking plate in applied position.

Still another object of the invention is to provide a retainer for attaching an object to a supporting structure comprising a member constructed of a section of sheet material and having deformed therefrom a substantially flat shank adapted for locking engagement with a spring locking plate in applied position.

A further object of the invention contemplates an installation embodying a retainer having a substantially flat shank cooperating with an improved locking plate capable of being removed from applied position in locked relation therewith.

A still further object is the provision of a spring retainer constructed of a single piece of wire and having an integral projecting portion providing a shank adapted for locking engagement with a spring locking plate.

Further objects and advantages of the invention will be apparent to those skilled in the art as a description thereof proceeds with reference to the accompanying drawings in which like reference characters designate like parts throughout the same, and in which:

Fig. 1 is a perspective of the under surface or non-exposed side of a sheet metal support showing a unit of the improved construction embodying a retainer or connecting member, represented in dotted lines, having interlocking engagement with a molding and secured to the support by a spring locking plate;

Fig. 2 is a cross-section of Fig. 1 taken along line 2—2, looking in the direction of the arrows;

Fig. 3 is a section taken on line 3—3 of Fig. 1, looking in the direction of the arrows;

Fig. 4 is a bottom perspective view showing a retainer as assembled in a molding preparatory to the application thereof to the support to be secured by a spring locking plate; and, Fig. 5 is a similar view showing the assembled molding and retainer as applied to the support and secured by a spring locking plate.

Fig. 6 is a plan view of a further embodiment comprising superposed apertured members secured under spring tension by a retainer having cooperative locking engagement with a spring locking plate; and, Fig. 7 is a section taken on line 7—7 of Fig. 6.

Figs. 8, 9 and 10 show an installation embodying a modified form of spring locking plate so designed as to permit removal thereof from locking engagement with the retainer by a rotating movement, Fig. 8 showing in plan the construction of the locking plate and its locking engagement with the retainer in applied fastening position securing superposed apertured members;

Fig. 9 shows in plan the installation represented in Fig. 8 with the locking plate ninety degrees removed from applied fastening position thereby permitting the locking plate and retainer to be disassociated; and, Fig. 10 is a perspective of the installation represented in Fig. 8.

Fig. 11 shows a form of retainer constructed of wire;

Fig. 12 shows the retainer of Fig. 11 as assembled in interlocking relation in a molding preparatory to the application thereof to a support to be secured by a spring locking plate;

Fig. 13 is a cross-section of a completed molding installation embodying the wire retainer illustrated in Fig. 11; and, Fig. 14 is a plan view of the completed molding installation represented in Fig. 13.

Fig. 15 represents in plan the configuration of a blank stamping from which a modified form of sheet metal retainer may be constructed;

Fig. 16 shows in perspective a spring retainer constructed from the blank represented in Fig. 15; and, Fig. 17 shows the retainer illustrated in Fig. 16 as assembled in interlocking relation in a molding preparatory to the application of the assembly to a support to be secured by a spring locking plate.

Fig. 18 represents the outline of a blank for a still further form of retainer designed for interlocking engagement with another type of molding;

Fig. 19 is a cross-sectional view of an assembled molding and retainer constructed from the blank represented in Fig. 18; and, Fig. 20 is a perspective looking from the underside of the assembled molding and retainer illustrated in Fig. 19.

Referring now, more particularly, to Figs. 1 to 5 inclusive of the drawings, there is shown a molding installation embodying a preferred form of retainer means assembled with the molding in interlocking engagement therewith and secured to a supporting structure of any suitable character by a spring locking plate. The letter A designates generally a fragment of a well-known form of metallic molding comprising base flanges B, C. The supporting structure is designated generally D, and inasmuch as the instant invention is intended mainly for use in the construction of metallic structures, such supporting structure usually consists of a metallic panel or plate-like element, as illustrated. In order that the molding, trim material or other finishing object may be secured thereto, said supporting structure D is provided with perforations E, disposed at regular intervals and at suitably spaced points along which the trim material extends in applied position. Such perforations may be either round or rectangular but preferably are rectangular, as shown, to snugly receive the substantially flat shank of the sheet metal retainer most effectively in a completed installation. The said perforations may be provided in the member constituting the support as by punching prior to the application of the molding thereto or the installation thereof as a part of a completed structure, and may also be formed in any other convenient manner as by tapping or drilling.

The molding which is to be mounted in accordance with the present invention is usually in the form of a channel-shaped strip although it is contemplated that the procedure of the instant invention be followed in securing moldings and finishing objects of any other configuration or cross-section. As shown in Fig. 1, the sides of the molding or trim material are each bent inwardly providing abutments or base flanges B, C, extending continuously along each side of the channel-shape and adapted for interlocking engagement with the retainer or connecting means on being mounted to the support as hereinafter set forth. The body of the molding intermediate the base flanges or abutments may be of any desired configuration or design for ornamental and artistic purposes. However, for the purposes of the present invention, directed to the general combination, it is only necessary that the molding, trim strip, or other finishing object be provided with some form of abutment means, or the like, on the underface thereof adapted for cooperative engagement with a form of retainer having a shank element which may be secured to the supporting structure by a spring locking plate presently to be described.

As shown in Figs. 4 and 5, the molding A is attached to the support D by means of one or more retainers 20 disposed in interlocking relation with the base flanges B, C, of the molding and secured to the supporting structure D by means of spring locking plates 1, having locking engagement with the shanks of the retainers passing through apertures E in the supporting member.

The retainer 20 may be most economically provided in a one-piece device constructed from a small section of sheet metal of lesser gauge than that of the molding, and preferably comprises a substantially rectangular plate of spring metal presenting a yieldable body 21, from which is struck and formed a shank element 22, to project therefrom at substantially right angles thereto. Inasmuch as the retainer is constructed of spring material, the body portion 21 thereof is yieldable and flexible and accordingly may be quickly sprung into interlocking relation with the base flanges B, C, of the molding A in fixed, rigid, frictional engagement therewith under continuous spring tension. Thus, due to their inherent resiliency and the said frictional engagement, the retainers are maintained in normal applied position along the length of the molding and in this relation serve to connect the molding to the supporting member under spring tension. In a still further relation, this arrangement for applying the retainers in fixed relation in the molding is highly advantageous from the standpoint of economy and speed in assembling operations in mass production in that the retainers may be assembled in definite spaced relation in the moldings, and the assemblies stacked in numbers ready for use, whereupon an operator on an assembly line may quickly mount a molding without stopping to attach the retainers or to align the shanks thereof with the apertures in the preperforated supporting member.

The spring locking plates 1, are provided from relatively thin sections of sheet metal, cold rolled metal, spring steel, or the like and may be round or of any other suitable configuration but, quite obviously, are most economically constructed from substantially rectangular sections obtained from strip stock. Such a section is suitably slit and formed within its periphery to present a plurality of yieldable tongues 2, 3, or the like, projecting out of the plane thereof and adapted for frictional locking engagement with the shank of a retainer under spring tension. As shown in Fig. 4, a preferred form of spring locking plate 5 comprises opposed, yieldable tongues 2, 3, extending upwardly intermediate bridge portions 4, 5, and end portions 6, 7, providing, what may be termed, the body of the locking plate, which body is readily flexible and is so formed in the stamping operation as to have a pronounced, generally concave configuration in normal, untensioned relation. Preferably, the extremities of the tongues 2, 3, are notched as at 8, 9, Fig. 4, thereby providing opposed recesses adapted for frictionally and rigidly engaging the longitudinal edges of the substantially flat shank of the retainer to which it is applied. Since the body of the locking plate is flexible, the tongue elements 2, 3, are necessarily relatively yieldable with respect to each other and readily adapted for sliding engagement with the shank of a retainer in one direction and accordingly, may speedily be applied to fastening position by a substantial axial, thrust-like motion in a minimum of time and effort and flattened in such fastening position thereby fixedly securing the assembled members of an installation under spring tension, as hereinafter more fully set forth.

From the foregoing it may be understood that a molding, trim strip, or other finishing object may be secured to a supporting member by means of a retainer and spring locking plate, above described, in substantially the following manner. The retainer 20, Fig. 4, comprising flexible body 21 and integral shank 22 is disposed in interlocking relation with the molding A by springing the said flexible body into abutting engagement with the base flanges B, C, of the molding; preferably, the retainer is so designed to seat in contact with the roof of the molding in applied position, as shown in Fig. 2, to rigidify the axial projecting relation of the shank 22 thereof with respect to the molding. As many of such retainers as necessary are applied in this manner depending on the length of the molding and are so positioned therein that the shanks 22 of the retainers are disposed in such spaced relation as to correspond substantially with the spacing of the apertures E in the preperforated supporting structure D. The molding provided with the retainers assembled therein in such suitable spaced relation is then brought to the preperforated supporting member and the shanks 22 of the retainers fitted into the perforations and the molding pressed into snug engagement with the adjacent surface of the support with said shanks 22 projecting therethrough on to the reverse side.

As illustrated in Fig. 5, the spring locking plates 1, are then applied to the projecting shanks of the individual retainers and pressure exerted in a substantial axial, thrust-like movement in which the yieldable tongues 2, 3, thereof are caused to slide along the shank 22 to the point at which the end portions 6, 7, of the generally concave base, contact the adjacent surface of the supporting member. At such point, upon continued pressure on the generally concave base of the locking plate, the end portions 6, 7 thereof are moved from their initial, normally untensioned position in the generally concave base outwardly and upwardly in a substantial lifting force which is transmitted to the tongues to urge the notched extremities thereof inwardly toward each other to the extent that the said tongues are caused to dig into and become embedded in the shank of the retainer under spring tension and thereby resist any tendency toward reverse movement or loosening. At the same time, the bowed bridge portions 4, 5, are elongated such that the generally concave base assumes the position of a substantially flat section which, in attempting to assume its initial, normally untensioned, concave configuration naturally tends to draw the shank of the retainer axially thereby taking up any clearance in the assembled parts and rigidly securing the molding or other connected part to the supporting structure under continuous spring tension. In this way the locking plates exert a continuously effective spring holding action axially of the shanks of the retainers, thereby drawing the molding toward the supporting structure, with the resilience of the locking plates and the resilience of the body portions of the retainers mutually contributing to the effectiveness of this action.

This most advantageous axial drawing action supplied by the spring locking plates to provide a tight rigid installation, is effected by the tensioned end portions 6, 7 and bridge portions 4, 5 which are moved from their pronounced, concave configuration when normally untensioned as represented in Fig. 4, to assume the position of a substantially thin, flat section in applied position as shown in Fig. 5. And accordingly, the said tensioned bridge and end portions in attempting to assume their initial, normally untensioned relation, produce a pronounced bending moment which not only effects a locking of the tongues 2, 3 by urging the notched extremities 8, 9 thereof into biting engagement with the longitudinal edges of the retainer, but also positively draws the shank of the retainer axially to take up any clearance between the assembled members, and otherwise provide a fixed, rigid installation under continuous spring tension. It has been found that this most effective locking and drawing action of the spring locking plates to provide a tight, rigid installation is best obtained when the concave bases thereof are flattened without any substantial pressure being exerted on the tongue elements themselves since any substantial pressure on the tongues prevents the same from having smooth sliding engagement with the shank of the retainer on being applied, and also deforms the same with respect to the generally concave base such that the extremities thereof are not in most effective contact with the cooperating shank, wherefore the tongues may have a tendency to slip and permit the locking plate to loosen from applied position in a tightened installation. This application of the spring locking plates is preferably effected by the use of a special tool comprising spaced jaws which may be fitted to the bridge portions 4, 5 of the locking plates without contacting the tongue elements. Thus, by substantial axial thrust, pressure may be applied to the bridge portions to flatten and tension the same in the generally concave base without deforming the tongues; and accordingly when the tool is withdrawn and the attendant pressure removed from the said flattened bridge portions, the tension stored therein causes the tongues to become embedded in the shank by substantial line contact and, at the same time, necessarily causes an axial drawing action on the shank of the retainer thereby providing a locked tightened installation. A tool of the character just described is illustrated in a copending application Serial Number 161,323, filed August 27, 1937 and since issued as Patent Number 2,177,232, October 24, 1939.

Figs. 6 and 7 show a further embodiment of the invention in which the retainer means is utilized to provide a fixed, rigid engagement in an installation comprising superposed members otherwise subject to possible shifting or relative rotary movement. As shown in Fig. 6, the superposed members F, G, are each provided with perforations, preferably rectangular apertures H, which may be aligned to permit the flat shank 22 of the retainer to be inserted therethrough. Inasmuch as the shank is substantially flat and the aligned apertures of the superposed members F, G, rectangular, the said flat shank element necessarily contacts the straight side walls thereof thereby preventing lateral displacement or relative shifting movement of the assembled members in any direction and particularly eliminating any possible relative rotary movement. The superposed members F, G, being assembled with their apertures H in substantial alignment and the shank 22 of the retainer projecting therethrough as shown, the application of the spring locking plate to the projecting portion thereof, is substantially similar to the procedure described with reference to the form of the invention represented in Figs. 1 to 5 inclusive. In this respect, the body 21 of the spring locking plate may be flexible and of generally concave configuration thereby providing for resiliency at this side of the joint; and since the locking plate is also flexible and the locking tongues 2, 3 thereof applied to the shank 22 of the retainer by flattening the end portions 6, 7, and bridge portions 4, 5, in the manner described, resiliency is provided on this side of the joint also; accordingly there is obtained a joint which is yieldable throughout and in which the respective members are rigidly and fixedly secured in position under continuous spring tension exerted on the outer faces thereof. Such a yieldable joint structure is highly advantageous for securing members of a fragile nature such as glass, porcelain, and vitreous coated sheet material.

In certain installations it is necessary or desirable that the spring locking plate be removable from the shank of the retainer in order that the respective members secured may be disassociated to permit access to concealed parts or to replace a damaged member. Figs. 8 to 10 inclusive disclose a novel arrangement in a spring locking plate by which the same may be quickly removed from locked engagement with the flat shank of the retainer by a quick, simple, relative rotary movement which disposes the extremities of the tongues out of engagement with the longitudinal edges of the shank of the retainer such that the locking plate is capable of being removed therefrom and disassociation of the assembled members is permitted. This novel arrangement in the spring locking plate is shown in an installation for securing superposed apertured members such as described with reference to Figs. 6 and 7, but it is quite obvious that such a locking plate may be embodied in any of the molding installations herein disclosed in which a retainer comprising a substantially flat shank is employed. As shown in Fig. 8, in this arrangement of the spring locking plate 1', the tongues 2', 3', thereof comprise substantially uniformly curved extremities 8', 9', provided by an opening 10 preferably, substantially elliptical in contour obtained by the use of a punch of similar cross-section. Thus, it will be appreciated that in the operation for producing such type of spring locking plates, a punch substantially elliptical in cross-section is employed such that a generally elliptical opening 10, defining the curved extremities of the tongues, is provided with the major axis thereof disposed transversely of the locking plate. This elliptical opening is so designed as to be smaller along its minor axis than the width of the shank 22 of the retainer, and on its major axis larger than the width of the retainer. Thus, along the minor axis of such opening, the curved extremities 8', 9' of the tongues 2', 3' of this form of spring locking plate are effective for engaging the shank 22 of the retainer in locking relation thereto as shown in Figs. 8 and 10. If, however, it is desired to remove the locking plate from such locking relation, it is only necessary to rotate the same ninety degrees relative to the shank 22 to the position represented in Fig. 9, whereupon the shank of the retainer is disposed along the major axis of the opening 10 in which relation the extremities 8', 9' are out of engagement with the shank and there is sufficient clearance to allow the locking plate to be removed and the shank of the retainer to be withdrawn thereby permitting the members F, G, to be disassociated.

Figs. 11 to 14 inclusive show a further embodiment of the invention comprising a modified form of retainer 31 constructed of a single piece of wire, or the like. The mid-portion of the wire is bent in the form of a substantial loop providing a resilient body portion 32 which includes one end of the wire. The opposite end of the wire is bent out of the plane of the loop as at 33 to provide a head or trolley element 34 for a purpose presently to be described, and is then further bent substantially at right angles to the plane of said body 32 to form the shank 35 of the retainer. Preferably, wire retainers of this form are bent prior to tempering, and after having been suitably formed are tempered to give the necessary stiffness and resilience. This resilience is inherent in the retainer throughout and accordingly permits the body portion 32 to be sprung into interlocking relation with the flange edges B, C, of the molding A, Fig. 12, preparatory to the application of the assembly to the supporting member D with the projecting shank 35 thereof passing through the round aperture E' provided therein. When the body portion 32 is sprung into interlocking relation with the base flanges of the molding, the head portion 34 serves as a substantial trolley element engaging the roof of the molding to seat the retainer and rigidify the axial projecting relation of the shank 35 thereof as shown in Fig. 13. Thus, the resilient loop 32 permits the ready approximate location of a retainer along the length of the molding and in suitable spaced relation to the spacing of the apertures in the preperforated supporting structure, while the contacting relation of the trolley element 34, Fig. 13, with the roof of the molding provides a firm, snug engagement of the retainer in applied position with the shank 35 thereof projecting substantially rigidly from the molding, thereby ensuring a tight, rigid installation under continuous spring tension when the spring locking plate is applied. As shown in Fig. 14, the type of locking plate and the application thereof to the shank of this form of retainer is substantially similar to that described in connection with the embodiment of the invention of Figs. 1–5 inclusive.

Figs. 15 to 17 inclusive disclose another embodiment of the invention in which the retainer 41 may be constructed of a small section of sheet metal comprising a substantially T-shaped blank stamping such as shown in Fig. 15. In this form of the retainer the portion 42 comprises the flexible body of the retainer while the projecting element 45 is bent substantially at right angles thereto to provide the shank thereof substantially as shown in Fig. 16. Thus, this form of the retainer may be assembled with the molding by springing the said flexible body portion 42 into interlocking relation with the base flanges of the molding substantially in the manner described above with reference to the form of the invention shown in Figs. 1 to 5 inclusive. However, in employing this form of retainer the flat shank provided by the T-shaped stamping is disposed substantially at right angles to the longitudinal axis of the molding when assembled therewith as distinguished from the installation represented in Figs. 1–5 inclusive wherein the flat shank of the retainer is disposed in parallelism with the longitudinal axis of the molding, and in this relation, the locking plate 1 when applied, is disposed also at right angles to the longitudinal axis of the molding. While the application of the locking plate is substantially the same, this form of the invention is more practical in certain installations in that the flexible body 42 of the retainer and the body of the locking plate are substantially directly oppositely disposed in applied position and thereby exert a localized clamping action ensuring a more compact and rigid construction throughout.

As shown in Figs. 19 and 20, certain installations embody a form of molding A' having no base flanges but rather, relatively wide side flanges B', C'. Such moldings may be most effectively attached by the use of a specific form of retainer provided with means adapted for frictional engagement with the said relatively wide side flanges. As represented in Fig. 18, such a retainer 51 may be constructed from a small substantially rectangular section of spring metal which is suitably slit and formed in a simple stamping operation to provide a resilient body 52 carrying a shank 55 and at either end provided with rounded shoulders 53, 54 suitably designed for snap-on engagement with the said side flanges B', C' of the molding. In this embodiment of the invention, the molding may be installed in either of two methods of procedure. Thus, in the preferred procedure described above with reference to the form of the invention of Figs. 1–5 inclusive, the retainers may be first assembled in the molding by snapping the shoulders 53, 54, into frictional engagement with the side flanges B', C' thereof. The assembly is then applied to one side of the supporting structure by fitting the shanks of the retainers into the apertures provided therein whereupon the spring locking plates are applied to the projecting shanks of the retainers at the opposed side of the support in the usual manner.

In an alternate procedure, the retainers are first applied to the outer surface of the supporting structure being firmly secured by the axial drawing action of the spring locking plates applied to the projecting shanks thereof at the inner surface of the support. The molding is then brought in position over the applied retainers and pressure exerted to force the side flanges B', C' thereof over the rounded shoulders 53, 54 in a substantial snap-on engagement. The inherent resilience of the body 52 of the retainer will permit this to be done, and said flanges will necessarily spring toward each other in snug frictional engagement with said shoulders whereupon the molding is fixedly mounted in applied position in the installation.

While this invention has been described in detail with specific examples such examples are illustrative only, since it will be apparent to those skilled in the art that other modifications within the spirit and scope of the invention may be constructed without departing from the teachings or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Fastening means for securing superposed parts under continuous spring tension comprising cooperating retainer and spring locking plate devices, said retainer including a substantially flat shank element and said locking plate comprising a pair of cooperating tongues having their extremities spaced apart for engaging said shank, one of said extremities being notched to provide a substantial jaw designed for biting engagement with a longitudinal edge of said substantially flat shank element in applied fastening position.

2. Fastening means for securing superposed parts under continuous spring tension comprising cooperating retainer and spring locking plate devices, said retainer including a substantially flat sheet metal shank element and said locking plate comprising a pair of cooperating tongues having their extremities notched to provide substantial jaws designed for biting engagement with the longitudinal edges of said substantially flat shank element in applied fastening position.

3. Fastening means for securing a member to an apertured support under continuous spring tension comprising cooperating retainer and spring locking plate devices, said retainer being provided with a resilient body portion adapted to resiliently engage said member under spring tension and a substantially flat shank passing through an aperture in the support to project onto the reverse side thereof, said spring locking plate comprising a section of sheet metal having a yieldable element deformed therefrom cooperating with the longitudinal edge of the projecting portion of said substantially flat shank in locked substantial biting engagement therewith under spring tension in applied fastening position, thereby providing a tightened installation of said member secured to the support under continuously effective spring tension supplied by both the retainer and spring locking plate.

4. Means for fastening superposed parts under continuous spring tension comprising a one-piece retainer device having a resilient body portion engaging one of said parts and a dependent substantially flat shank passing through an aperture in the other of said parts to project onto the reverse side thereof, and securing means comprising a spring locking plate having a yieldable element deformed therefrom cooperating with the longitudinal edge of the projecting portion of said substantially flat shank in locked biting engagement therewith, said locking plate comprising a generally concave base which when flattened in applied fastening position operates to draw the said shank of the retainer device axially to tighten the installation under continuously effective spring holding action.

5. Means for fastening superposed parts under continuous spring tension comprising a one-piece retainer device having a flexible body portion yieldably engaging one of said parts and a dependent substantially flat shank passing through an aperture in the other of said parts to project onto the reverse side thereof, and securing means comprising a spring locking plate having a yieldable element deformed therefrom cooperating with the longitudinal edge of the projecting portion of said substantially flat shank in locked biting engagement therewith, said locking plate in applied fastening position operating to draw said shank of the retainer device axially to tighten the installation under continuously effective spring holding action, said flexible body portion and spring locking plate cooperating to provide a joint which is yieldable at either side of said superposed parts.

6. Means for fastening superposed parts under continuous spring tension comprising a one-piece sheet metal retainer device having a flexible body portion yieldably engaging one of said parts and a dependent substantially flat shank passing through an aperture in the other of said parts to project onto the reverse side thereof, and securing means comprising a spring locking plate having deformed therefrom a yieldable element provided with a notched extremity cooperating with the longitudinal edge of the projecting portion of said substantially flat shank in locked biting engagement therewith, said locking plate in applied fastening position operating to draw the shank of the retainer device axially to tighten the installation under continuously effective spring holding action, said flexible body portion and spring locking plate cooperating to provide a joint which is yieldable at either side of said superposed parts.

7. Fastening means for securing superposed parts under continuous spring tension comprising cooperating retainer and spring locking plate devices, said retainer including a substantially flat shank element and said locking plate comprising a pair of cooperating tongue elements having their extremities spaced apart and designed for biting engagement with the longitudinal edges of said substantially flat shank element in applied fastening position, the extremity of one of said tongue elements being curved to provide for ready relative rotary movement of the locking plate and shank element from such applied fastening position to permit disengagement thereof.

8. Fastening means for securing superposed parts under continuous spring tension comprising cooperating retainer and spring locking plate devices, said retainer including a substantially flat shank element and said locking plate comprising a pair of cooperating tongue elements having their extremities spaced apart and designed for biting engagement with the longitudinal edges of said substantially flat shank element in applied fastening position, the extremities of said tongue elements being curved to provide for ready relative rotary movement of the locking plate and shank element from such applied fastening position to permit disengagement thereof.

9. Fastening means for securing superposed parts under continuous spring tension comprising cooperating retainer and spring locking plate devices, said retainer comprising a one-piece sheet metal body including a substantially flat sheet metal shank element projecting therefrom, said locking plate comprising a pair of cooperating tongue elements having their extremities spaced apart and designed for biting engagement with the longitudinal edges of said substantially flat sheet metal shank element in applied fastening position, the extremity of one of said tongue elements being curved to provide for ready relative rotary movement of the locking plate and shank element from such applied fastening position to permit disengagement thereof.

10. Fastening means for securing superposed parts under continuous spring tension comprising cooperating retainer and spring locking plate devices, said retainer comprising a one-piece sheet metal body including a substantially flat sheet metal shank element projecting therefrom, said locking plate comprising a pair of cooperating tongue elements having their extremities spaced apart and designed for biting engagement with the longitudinal edges of said substantially flat sheet metal shank element in applied fastening position, the extremities of said tongue elements being curved to provide for ready relative rotary movement of the locking plate and shank element from such applied fastening position to permit disengagement thereof.

11. Fastening means for securing a member to an apertured support under continuous spring tension comprising cooperating retainer and spring locking plate devices, said retainer comprising a one-piece sheet metal device providing a resilient body portion adapted to resiliently engage said member and an integral substantially flat shank passing through the aperture in the support to project onto the reverse side thereof, said spring locking plate having a yieldable element deformed therefrom engaging the edge of the projecting portion of said substantially flat shank in locked, biting engagement therewith under spring tension in applied fastening position, said yieldable element of the locking plate having a curved extremity permitting disengagement thereof from said flat shank upon rotary movement of the locking plate from such applied fastening position.

12. Fastening means for securing a member to an apertured support under continuous spring tension comprising cooperating retainer and spring locking plate devices, said retainer comprising a one-piece sheet metal device providing a resilient body portion having resilient fastening engagement with said member under spring tension and an integral, substantially flat shank passing through the aperture in the support to project onto the reverse side thereof, said spring locking plate having a yieldable element deformed therefrom engaging the edge of the projecting portion of said substantially flat shank in locked biting fastening engagement therewith, said locking plate having a generally concave base which when flattened in applied fastening position operates to draw the shank of the retainer axially to provide a tightened installation under continuously effective spring holding action, and said yieldable element of the locking plate having a curved extremity permitting rotary movement thereof out of fastening engagement with said shank for removal of the locking plate from such applied fastening position.

13. Means for removably fastening superposed parts comprising a device having a body portion engaging one of said parts and a substantially flat, dependent shank passing through an aperture in the other of said parts to project onto the reverse side thereof, and securing means comprising a spring locking plate having a yieldable element deformed therefrom cooperating with the longitudinal edge of the projecting portion of said substantially flat shank in locked biting engagement therewith, said locking plate in applied fastening position operating to draw said shank axially to tighten the installation under continuously effective spring holding action, and said yieldable element having a curved extremity permitting rotary movement thereof out of engagement with said shank for removal of the locking plate from applied fastening position.

14. Means for removably fastening superposed parts under continuous spring tension comprising a one-piece sheet metal device having a resilient body portion yieldably engaging one of said parts and an integral substantially flat shank passing through an aperture in the other of said parts to project onto the reverse side thereof, and securing means comprising a spring locking plate having a yieldable element deformed therefrom cooperating with the longitudinal edge of the projecting portion of said substantially flat shank in locked biting engagement therewith, said locking plate in applied fastening position operating to draw said shank axially to tighten the installation under continuously effective spring holding action, the said resilient body portion and spring locking plate cooperating to provide a joint which is yieldable at either side of said superposed parts, and said yieldable element of the locking plate having a curved extremity permitting rotary movement thereof out of engagement with said shank for removal of the locking plate from applied fastening position.

15. Fastening means for mounting a molding or the like onto an apertured support under continuous spring tension comprising cooperating retainer and spring locking plate devices, said retainer comprising a resilient body portion adapted for frictional interlocking relation with the molding under spring tension and a substantially flat shank passing through an aperture in the support to project onto the reverse side thereof, said spring locking plate having a yieldable element struck and formed therefrom adapted to cooperate with the longitudinal edge of the projecting portion of said substantially flat shank in locked substantial biting engagement therewith under spring tension in applied fastening position, whereby to provide a tightened installation of the parts secured under continuously effective spring tension supplied by both the retainer and spring locking plate.

16. Means for mounting a molding or the like onto an apertured support comprising a one-piece sheet metal retainer device providing a body portion having interlocking relation with the molding and an integral, substantially flat shank passing through the aperture in the support to project onto the reverse side thereof, and securing means comprising a spring locking plate having a yieldable element deformed therefrom cooperating with the longitudinal edge of the projecting portiton of said substantially flat shank in locked biting engagement therewith, said locking plate operating in applied fastening position to draw the shank of the retainer device axially to provide a tightened installation.

17. Means for mounting a molding or the like onto an apertured support comprising a one-piece sheet metal retainer device providing a flexible body portion having fixed, interlocking relation with the molding under spring tension and an integral, substantially flat shank passing through the aperture in the support onto the reverse side thereof, and securing means comprising a spring locking plate having a yieldable element deformed therefrom cooperating with the longitudinal edge of the projecting portion of said substantially flat shank in locked biting engagement therewith, said locking plate having a generally concave base which when flattened in applied fastening position operates to draw the shank of the retainer device axially to provide a tightened installation under continuously effective spring holding action.

GEORGE A. TINNERMAN.